May 7, 1935.  P. J. BERGGREN  2,000,436

FLEXIBLE DRIVE CONNECTION FOR WEB REELING APPARATUS

Original Filed Dec. 20, 1923  2 Sheets-Sheet 1

Per Johan Berggren.
INVENTOR.

BY Darby & Darby
ATTORNEYS.

Per Johan Berggren.
INVENTOR.

BY Darby & Darby
ATTORNEYS.

Patented May 7, 1935

2,000,436

UNITED STATES PATENT OFFICE 2,000,436

FLEXIBLE DRIVE CONNECTION FOR WEB REELING APPARATUS

Per Johan Berggren, Chicago, Ill.

Original application December 20, 1928, Serial No. 327,200. Divided and this application May 5, 1933, Serial No. 669,520

5 Claims. (Cl. 242—55)

This invention relates to web reeling apparatus and with particularity to flexible drive connections for such apparatus.

An object of the invention is to provide means for preventing breakage or injury incident to the reeling and unreeling of a motion picture film.

A feature of the invention relates to the method of coupling a motion picture reel to a drive shaft.

Another feature relates to the organization, arrangement and relative location of parts which go to make up a simple, cheap and efficient driving connection for motion picture reels.

Referring to the accompanying drawings.

While the invention is described as applied to a motion picture projecting machine such as described in detail in application Serial No. 327,200, filed December 20, 1928, it will be understood that the invention is applicable to any known type of motion picture projecting apparatus. Accordingly only those parts of the motion picture projector are shown in order to enable a clear understanding to be attained of the invention.

Figure 1:
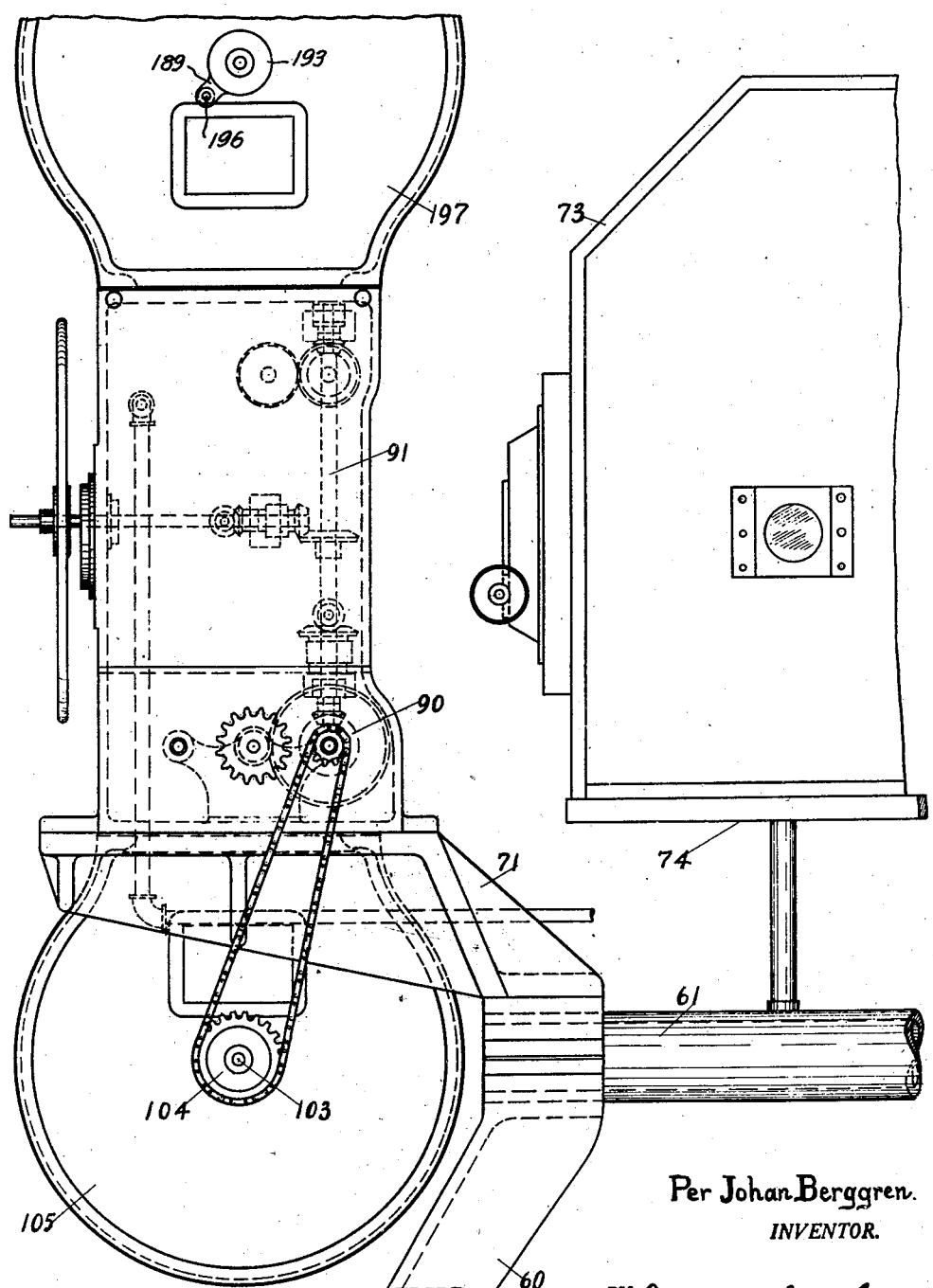
Figure 1 is a partial view in elevation of a motion picture machine embodying features of the invention.
Figure 2:
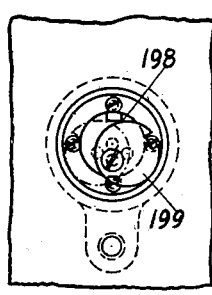
Fig. 2 is an end view showing the manner of fastening the pay-off and take-up reels on their respective drive shafts.
Figure 3:
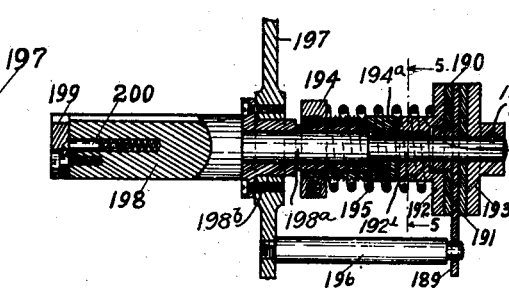
Fig. 3 is a detail sectional view showing the manner of flexibly coupling the pay-off reel to its drive shaft.
Figure 4:
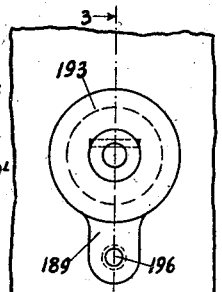
Fig. 4 is an end view of the coupling means of Fig. 3.
Figure 5:
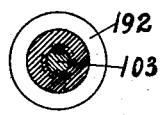
Fig. 5 is a sectional view taken along the line 5—5 of Fig. 3.
Figure 6:
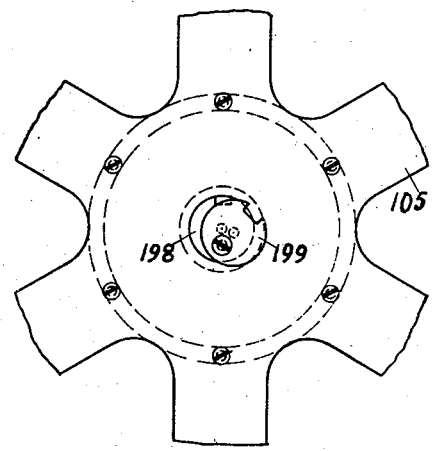
Fig. 6 is a partial end view of the take-up reel showing the pivoted member for holding the reel on its shaft.
Figure 7:
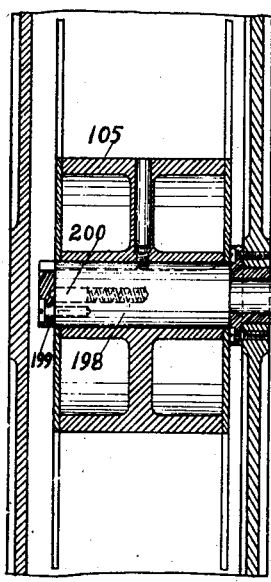
Fig. 7 is a detail sectional view of the film receiving reel showing the means for taking up wear in journal bearings thereof.
Figure 8:
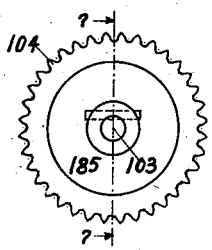
Fig. 8 is an end view of the sprocket and disc coupling means of Fig. 7.

Accordingly in Fig. 1 the numeral 60 represents one of the supporting standards of the motion picture projector to which is attached the horizontal bar 61 carrying the base 74 on which is mounted the lamp housing 73 and associated parts. Attached to the standard 60 is bracket 71 which supports the upper or pay-off reel 197 and the lower or take-up reel 105, together with the associated projection and film feeding devices illustrated diagrammatically in Fig. 1 of the drawings.

The take-up reel 105 is carried by a shaft 103, which is driven through bevel gears 90 from main shaft 91 by means of a sprocket operating over a sprocket wheel 104. Shaft 103 is supported in a long bearing member 103$^a$. The sprocket wheel 104 is held between two fibre washers 183, 184 and is otherwise loose to rotate on the reel shaft. The sprocket wheel 104 is provided with an extended bearing hub 104$^a$. The washers 183, 184 are clamped against opposite faces of the sprocket wheel by means of discs 185, 186 and are freely and rotatably mounted. The outer disc 185 is mounted on the reel shaft 103, and is secured thereto by pin 185' to rotate therewith. The inner disc 186 is splined to rotate with the reel shaft but free to slide therealong and is provided with an extended bearing hub 186$^a$. A spring 187 is coiled upon the reel shaft and is held in compression between the disc 186 and an adjustable nut 188, whereby its compression may be adjusted. The nut 188 is supported on a long sleeve 188$^a$ secured to shaft 103 by means of a set screw 188$^b$ and telescoped with the bearing member 103$^a$. By reason of this structure, both the nut and the disc rotating with the reel shaft, the compression spring likewise rotates with said shaft, so that there is no relative rotation of the spring and nut or disc, which would cause wear or a rut or groove and a consequent change of tension of the spring. Consequently I am enabled to secure a constant even pressure of both discs at all times, on the respective faces of the driving sprocket without regard to any increase in weight due to the film being wound on the reel. This is particularly advantageous with a wide and heavy film because otherwise the increasing weight of the film load on the reel would increase the tendency to cant the shaft and thereby cause an increasing centrifugal action which would tend to pull the shaft away from the line of sprocket drive, thereby increasing the tension of the spring and finally causing it to grip the disc, thereby locking the sprocket wheel to the reel shaft and resulting in breakage of the film.

The magazine or pay-off reel employs substantially the same structure but it operates in a reverse manner to that above described in that instead of a driven sprocket wheel, a stationary disc 189 is interposed between the two friction discs 190, 191, the clamp discs 192, 193, nut 194 and spring 195 being the same in function and operation as above described. The disc 192 has an extended hub 192'. The disc 193 is secured to shaft 198$^a$ by means of pin 193'. The nut 194 is supported on the long sleeve 194$^a$. The disc 198 is held stationary by means of a pin or stud 196 and has an extended hub 189'. Thus an even frictional resistance is maintained at all times on the unreeling rotations of the reel. The reels 196, 197 are detachably locked on the barrels 198 of their shaft 198ª, by means of a lug 199, eccentrically mounted on the end surface of each shaft so that when turned into one position the lug will extend beyond the periphery of the shafts, thereby forming a retainer to retain the reel on the shaft, and when turned into another position it will be out of reel retaining position. The shaft 198ª is supported in a long bearing 198ᵇ similar to bearing 103ª. A spring pressed stud 200 serves to detachably retain the retaining lug in locking or in releasing position.

This application is a division of application Serial No. 327,200, filed December 20, 1928.

What is claimed is:

1. In a motion picture apparatus, a film reel, a shaft upon which the reel is mounted, a long bearing member in which the shaft is journaled, a sleeve secured to said shaft and telescoped with said bearing member, a sprocket wheel journaled on said shaft, friction discs engaging both sides of said sprocket, a clamping disc secured to said shaft and engaging one of said friction discs, a second clamping dis having an extended hub on said shaft and engaging the other friction disc, an adjustable nut on said sleeve, and a compression spring lying between said nut and said second clamping disc.

2. In a motion picture apparatus, a film reel, a shaft upon which the reel is mounted, a long bearing member in which the shaft is journaled, a sleeve secured to said shaft and telescoped with said bearing member, a sprocket wheel journaled on said shaft, friction discs engaging both sides of said sprocket, a clamping disc secured to said shaft and engaging one of said friction discs, a second clamping disc having an extended hub on said shaft and engaging the other friction disc, an adjustable nut on said sleeve, and a long compression spring lying between said nut and said second clamping disc, all of said parts with the exception of the long bearing member being rotatable as a unit with said shaft.

3. In a motion picture apparatus, a film reel, a shaft for supporting said reel, a long fixed bearing member in which said shaft is journaled, said shaft at the end opposite the reel extending beyond said bearing member, a sprocket wheel having an extended hub rotatably mounted on the extending end of said shaft, a clamping disc secured on the extending end of said shaft adjacent the sprocket wheel, a second clamping disc having an extended hub splined to the extending end of said shaft, a pair of friction discs interposed between the sprocket wheel and the clamping discs, said friction discs being freely and rotatably mounted, the extended hub of the sprocket projecting through one of said friction discs, a long sleeve secured to the extending end of said shaft and overlying the bearing member, a long compression spring surrounding said sleeve and engaging one of the clamping discs, and means on said sleeve for adjusting the tension on said spring.

4. In a motion picture apparatus, a film reel, a rotatable shaft for supporting said reel, a long bearing member in which said shaft is journaled, a disc freely mounted on said shaft and fixed against rotation, a clamping disc secured to said shaft on one side of said fixed disc, a second clamping disc splined to said shaft and mounted on the opposite side of said fixed disc, said second clamping disc having an extended hub portion, a pair of friction discs interposed between the fixed disc and the clamping discs, a long sleeve secured to said shaft and overlying said bearing member, an adjustable nut on said sleeve, and a long compression spring interposed between the nut and said second clamping disc.

5. In a motion picture apparatus, a film reel, a rotatable shaft for supporting said reel, a long bearing member in which said shaft is journaled, a disc freely mounted on said shaft and fixed against rotation, a clamping disc secured to said shaft on one side of said fixed disc, a second clamping disc splined to said shaft and mounted on the opposite side of said fixed disc, said second clamping disc having an extended hub portion, a pair of friction discs interposed between the fixed disc and the clamping discs, a long sleeve secured to said shaft and overlying said bearing member, an adjustable nut on said sleeve, and a long compression spring interposed between the nut and said second clamping disc, said fixed disc having an extended hub portion in contact with said shaft.

PER JOHAN BERGGREN.